United States Patent [19]

Kanemoto et al.

[11] Patent Number: 5,250,214

[45] Date of Patent: Oct. 5, 1993

[54] LIQUID CRYSTAL COLOR DISPLAY DEVICE PROVIDED WITH A COLOR FILTER FILM AND AN OPTICAL PHASE PLATE COMPRISING LIQUID CRYSTAL POLYMER

[75] Inventors: Akihiko Kanemoto; Haruo Iimura, both of Yokohama; Yasuyuki Takiguchi; Shigeki Iida, both of Kawasaki; Takehiro Toyooka; Hiroyuki Ito, both of Yokohama, all of Japan

[73] Assignees: Ricoh Company, Ltd.; Nippon Oil Company, Limited, both of Tokyo, Japan

[21] Appl. No.: 681,898

[22] Filed: Apr. 8, 1991

[30] Foreign Application Priority Data

Apr. 9, 1990 [JP] Japan ................. 2-94814
Apr. 19, 1990 [JP] Japan ............... 2-104505
Apr. 19, 1990 [JP] Japan ............... 2-104506

[51] Int. Cl.⁵ .................. C09K 19/52; G02F 1/13
[52] U.S. Cl. .................. 252/299.01; 359/63; 359/68
[58] Field of Search ......... 252/582, 299.01, 585; 359/68, 98, 63, 64

[56] References Cited

U.S. PATENT DOCUMENTS

| | | | |
|---|---|---|---|
| 4,080,046 | 3/1978 | Nishizaki | 350/347 R |
| 4,385,806 | 5/1983 | Fergason | 359/73 |
| 4,443,065 | 4/1984 | Funada et al. | 359/93 |
| 4,466,702 | 8/1984 | Wiener-Avnew et al. | 350/347 R |
| 4,533,214 | 8/1985 | Penz et al. | 350/337 |
| 4,701,028 | 10/1987 | Clerc et al. | 350/347 E |
| 4,779,957 | 10/1988 | Suginoya et al. | 359/68 |
| 4,844,569 | 7/1989 | Wada et al. | 350/347 E |
| 4,904,058 | 2/1990 | Kato et al. | 359/53 |
| 4,909,606 | 3/1990 | Wada et al. | 350/347 E |
| 4,921,728 | 5/1990 | Takiguchi et al. | 427/58 |
| 4,936,654 | 6/1990 | Suzaki et al. | 350/347 E |
| 4,957,349 | 9/1990 | Clerc et al. | 350/347 R |
| 4,973,137 | 11/1990 | Kozaki et al. | 350/347 R |
| 4,984,873 | 1/1991 | Takiguchi et al. | 350/337 |
| 4,995,704 | 2/1991 | Yamamoto et al. | 350/347 R |
| 5,011,623 | 4/1991 | Yoshinga et al. | 252/299.01 |
| 5,016,988 | 5/1991 | Iimura | 350/347 R |
| 5,039,185 | 8/1991 | Uchida et al. | 359/93 |
| 5,056,896 | 10/1991 | Iimura et al. | 359/93 |
| 5,059,000 | 10/1991 | Kaneko et al. | 359/68 |
| 5,070,326 | 12/1991 | Yoshimoto et al. | 359/74 |
| 5,101,289 | 3/1992 | Takao et al. | 359/68 |
| 5,124,825 | 6/1992 | Asano et al. | 359/77 |
| 5,144,464 | 9/1992 | Ohnishi et al. | 359/68 |

FOREIGN PATENT DOCUMENTS

| | | | |
|---|---|---|---|
| 0284372 | 9/1988 | European Pat. Off. | 350/347 R |
| 0311405 | 4/1989 | European Pat. Off. | 350/347 R |
| 0312297 | 4/1989 | European Pat. Off. | 350/347 R |
| 0341702 | 11/1989 | European Pat. Off. | 350/347 R |
| 0128319 | 8/1982 | Japan | 350/345 |
| 0159117 | 7/1987 | Japan | 350/347 R |
| 0210934 | 8/1989 | Japan | 350/347 R |
| 0217315 | 8/1989 | Japan | 350/347 R |
| 1462978 | 1/1977 | United Kingdom | 350/347 R |

OTHER PUBLICATIONS

Iimura et al.–"STN-LCD with Improved Viewing Angle Characteristics Using A Birefringent Film" SID 89 Digest-vol. XX–May 1989-pp. 398–401.

*Primary Examiner*—Philip Tucker
*Attorney, Agent, or Firm*—Oblon, Spivak, McClelland, Maier & Neustadt

[57] ABSTRACT

The present invention discloses a liquid crystal color display device comprising;

a liquid crystal cell comprising a pair of substrates, a liquid crystal layer positioned between the substrates and transparent electrodes on the substrates to apply voltage to the layer;

a pair of polarizers positioned on opposite sides of the cell; and a combination of a color filter film and an optical phase plate positioned between the liquid crystal layer and at least one of the polarizers:

wherein the phase plate comprises a film of liquid crystal polymer composition having polyester as a main constituent, being thermotropic and having a glass transition point, and the device is high in productivity, light in weight, good in color reproducibility, good in contrast, excellent in color tone display dependency upon viewing angle and wide in viewing angle.

13 Claims, 4 Drawing Sheets

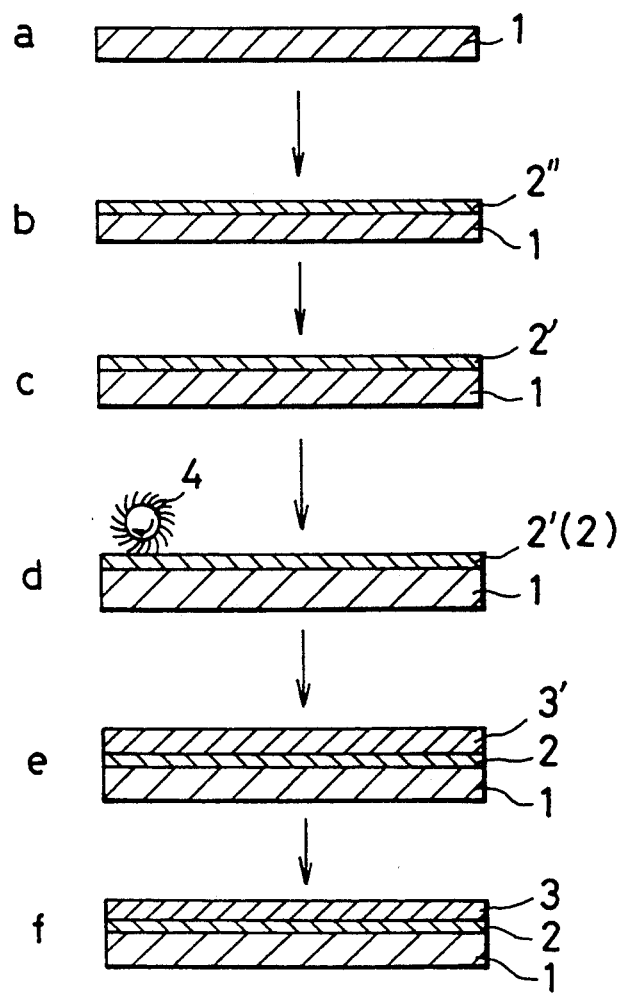

LIQUID CRYSTAL COLOR DISPLAY DEVICE PROVIDED WITH A COLOR FILTER FILM AND AN OPTICAL PHASE PLATE COMPRISING LIQUID CRYSTAL POLYMER

BACKGROUND OF THE INVENTION

The present invention relates to a liquid crystal color display device comprising:

(1) a liquid crystal cell comprising a pair of substrates, a liquid crystal layer positioned between the substrates and a transparent electrodes on the substrates to apply voltage to the layer;

(2) a pair of polarizers positioned on opposite sides of the cell; and (3) a combination of a color filter film and an optical phase plate comprising a liquid crystal polymer composition, having a polyester as a main constituent, which is thermotropic and has a glass phase below the temperature range of liquid crystalline phase positioned between the liquid crystal layer and at least one of the polarizers.

A mode of display of a liquid crystal (hereinafter referred to as "LC") so far mainly used, is an one called Twisted Nematic (hereinafter referred to as "TN") type which has LC molecular configuration twisted about 90° between a pair of substrates and utilizes a rotation of polarization plane by the configuration and a cancellation of the rotation by a voltage application. Although this display device has advantages that as this device is for a white and black display, it has an excellent shutter effect and when provided with color filter on each of color elements, it is relatively easy to use this device as a multicolor display device, it has a disadvantage that its highly multiplexing drive is difficult because of its bad threshold characteristics on a voltage-transmittance relationship. Therefore, on a display with large information content, there exist several problems such as a low contrast and a narrow viewing angle.

To solve these problems by improving a steepness of a relationship between voltage and transmittance, an idea was proposed to utilize a birefringent effect of LC by making a gap between a polarizing axis of the polarizer and an aligned direction of LC molecule, of which twist angle is larger than TN. A mode improved by the idea are called super twisted birefringence effect (hereinafter referred to as "SBE") or super twisted nematic (hereinafter referred to as "STN") mode.

Although the mode had an excellent features that its contrast was less lowered and its viewing angle was wide even at a highly multiplexing drive because of its excellent threshold value, the mode gave a tinted display due to its birefringent effect and the colorization was very difficult.

To improve the tinted image of STN mode, a two-layer type STN mode LC display device was recently developed. This type had two LC cells having reverse twisted angle each other, one for deriving and the other for color compensation and exhibits a black and white display. Since this device had two LC cells, the device itself became thick and heavy and its productivity was bad.

Although these disadvantages were able to improve by applying a birefringent LC polymer film instead of the LC cell for compensation, which is so-called "a phase-plate type black and white display STN LC display device". However, the phase-plate type device was not able to get a sufficient contrast and further its viewing angle became narrow.

In the two-cell type device, it was recommended to use a LC polymer, having twisted molecular configuration, as a compensation plate instead of the cell for compensation. This type used a coated and aligned LC polymer film as the main constituent of the compensation plate.

Generally speaking, to use a LC material for a display device, it is necessary to align LC molecules in a certain direction. These LC molecules change their alignment under an affect of a force from outside such as electric field, magnetic field or shear stress. Accordingly, LC is utilized in a field of various electronics by utilizing changes of its optical properties accompanied with the above alignment change.

LC is largely divided into a polymer type and a low molecular weight type. Among these, LC polymer has higher viscosity in LC phase compared with low molecular weight LC (hereinafter referred to as "general type LC"). Due to the higher viscosity, LC polymer has a unique property which make it possible to align the polymer under LC phase and immobilize the alignment by cooling the polymer lower than its glass transition point. Using this unique property, several application of the polymer in an optical electronic field such as (i) an aligning film for a general type LC [Japanese Patent Application, Laid-Open (KOKAI), {hereinafter referred to as "JPA-L"} No. 61-42,618 (1986)], non-linear optical device [JPA-L, No. 62-201,419 (1987)], optical memory [JPA-L, No. 62-66,990 (1987)] and optical filter [JPA-L, No. 60-191,203 (1985)] have been tried, and to realize these trials, it is necessary to strictly control its molecular alignment in desired forms. For instance, a color compensation plate of a STN type LC display device, which is a kind of optical filters and is placed between the LC cell and the polarizer, is necessary to have a function to bring back a light elliptically polarized by passing through the LC cell to a linearly polarized light. The function can only be developed by aligning the LC polymer molecules parallel to a plane of the plate and also in one direction in uniformity and in high order.

An aligning method of general type LC has almost been established but the method aligning LC polymer has not necessarily been sufficiently established. Within a limited area only, some methods to align LC polymer even with a better order parameters than those of a general LC, not withstanding the LC is nematic, smectic or cholesteric type, are already known. However, these methods use an outside force such as electric field, magnetic field or shear stress, there are still problems that to control the alignment with a large area is impossible and although it is possible to align LC molecule parallel to a plane, it is impossible to align the polymer molecules in one direction in the plane. If LC polymer is injected into a space between a pair of substrates having received an aligning treatment, which is a usual method to obtain a general LC cell, because of high viscosity of the polymer in a LC phase, the LC polymer molecules are oriented along a flow of the polymer entering into the space and we can not have an alignment desired. Further, for a device with a large area, an injection of the LC polymer is very difficult because of its high viscosity.

In the two LC cell type device mentioned before, when a LC polymer film is used instead of the cell for compensation, since only one substrate is enough to hold LC polymer film, taking advantage of its self-standability, the device can be thinner comparing to the two-cell type LC display device so far developed and can have as good contrast as that of the two-cell type device. However, still in this case an increase of thickness and weight of the device by an additional substrate to support the LC polymer film can not be avoided.

Incidentally, when an optical phase plate is prepared by stretching conventional polymer film, it is impossible to introduce a twisted configuration in the film. Therefore, when a combination of the plate and a color filter film is used for a multi-color or a full-color display, though it can be used with certain difficulties, it is especially preferable to improve several points, for instance, narrow color-reproducible range or a dark image because of a necessity to increase a optical density of the color filter.

As a result of the present inventors' extensive studies to solve disadvantages mentioned so farand obtained an excellent LC color display device, it has been found that:

(1) an optical phase plate used in the conventional LC color display device can largely be improved by replacing it with a film of LC polymer composition, which is thermotropic and has a glass transition point, (2) further, it is preferable to use a LC polymer composition which contains a polyester, as a main constitutent, containing an aromatic unit of specific construction as an one of constitutents; and (3) by placing a combination of a color filter and the improved phase plate between a LC cell and at least one of the polarizers, a LC color display device being thin in thickness, light in weight, high in contrast, wide in viewing angle, high in productivity and less color dependency upon viewing angle can be obtained. Further, they have found that an alignment of LC polymer composition of the present invention should be strictly controlled.

Based upon these findings, the present inventors achieved the present invention.

BRIEF EXPLANATION OF THE DRAWINGS

FIG. 6 represents a cross-sectional drawing comprising a substrate, a LC polymer composition film and an aligning film designed to give the LC film a highly controlled molecular alignment;

FIG. 7, a to f, explain a method to prepare the phase plate of FIG. 6;

Numerical figures attached to the drawings are:

| FIG 1: | |
| --- | --- |
| 15; | substrate |
| 16; | aligning film for 17 |
| 17; | LC polymer composition film |

| -continued | |
| --- | --- |
| 18; | color filter film |
| FIGS. 2 to 4: | |
| 11,21 | substrates |
| 12,22 | transparent electrodes |
| 13,23; | aligning films |
| 14; | sealing material |
| 15. | LC layer |
| 16; | LC cell |
| 17,27 | polarizers |
| 30; | combined layer of color filter film and phase plate |
| FIGS. 6 and 7: | |
| 1: | substrate |
| 2 | aligning film |
| 3: | LC polymer composition film |
| 4; | rubbing material |
| FIG. 9: | |
| 19; | substrate A |
| 20; | substrate B |
| 21; | substrate C |

SUMMARY OF THE INVENTION

An object of the present invention is to provide a LC color display device placing a combination of a color filter film and an optical phase plate, comprising a LC polymer composition film, which is thermotropic and has a glass transition point, having a polyester as a main constituent; between a LC cell and at least one of polarizers.

In the present invention, the term "LC polymer" means a mixture of a LC polymer and another LC polymer and/or a substance(s) other than a LC polymer, such as a chiral substance, an optically active compound and the composition still exhibiting the specific features of a LC polymer. Further, since a practical meaning of the term "having as a main constituent" varies according to a kind of LC polymer and a kind of additives, it is quite difficult to determine a practical ratio, for instance % by weight of the main constituent, usually it is preferable to contain at least 50% by weight of the constituent and more preferable at least 70% by weight.

Another object of the present invention is to provide a LC color display device comprising a LC polymer composition having polyester, as a main constituent, containing ortho substituted aromatic unit as one of constituents.

Still another object of the present invention is to provide a LC color display device comprising a LC polymer composition having polyester, as a main constituent, containing an aromatic unit being bulky, having a bulky substituent or having fluorine atom(s) or fluorine containing group(s) as a substituent, as one of constituents.

Further, an object of the present invention is to provide a LC color display device having an optical phase plate comprising a substrate, an aligning film of polyimide, formed on the substrate, having an elongation at break not higher than 15% and being treated with rubbing and a LC polymer film, formed on the aligning film and containing a polyester as a main constituent.

Still further, an object of the present invention is to provide a LC color display device putting a combination of a color filter film and an optical phase plate between one of substrates of LC cell and a cell layer and the substrate of the LC cell also has a function of a substrate of the phase plate.

Furthermore, an object of the present invention is to provide a LC color display device which is high in productibity, light in weight, good in color reproducibility, good in contrast on a display surface, excellent in color tone display dependency on viewing angle and wide in viewing angle.

DETAILED DESCRIPTION OF THE INVENTION

Hereinafter, the detail of the present invention will be described together citing the attached drawings.

First of all, all the materials used in the display device of the present invention except sealing material 14, such as substrate, polarizer, aligning film, electrode, phase plate, compensation plate, are optically transparent unless otherwise clearly described.

Figure 2:
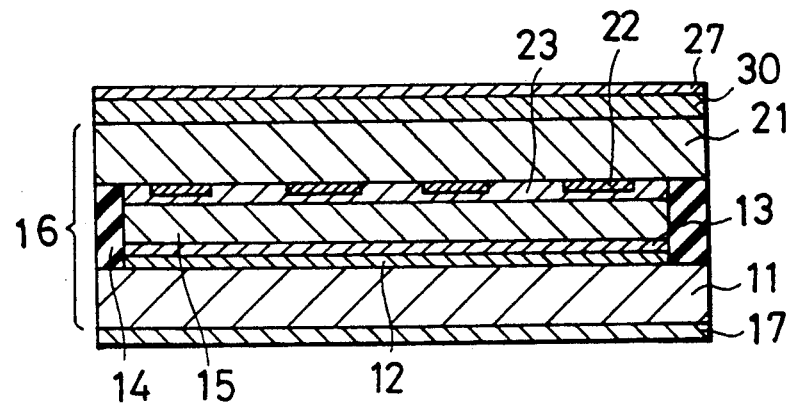
FIGS. 2, 3 and 4 are cross-sectional drawings showing examples of constituents of LC color display device using the phase plate of FIG. 1.
Figure 3:
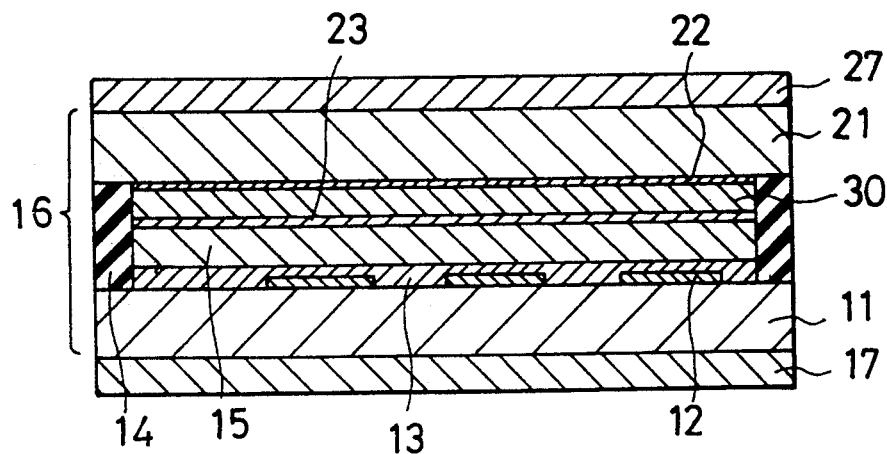
Figure 4:
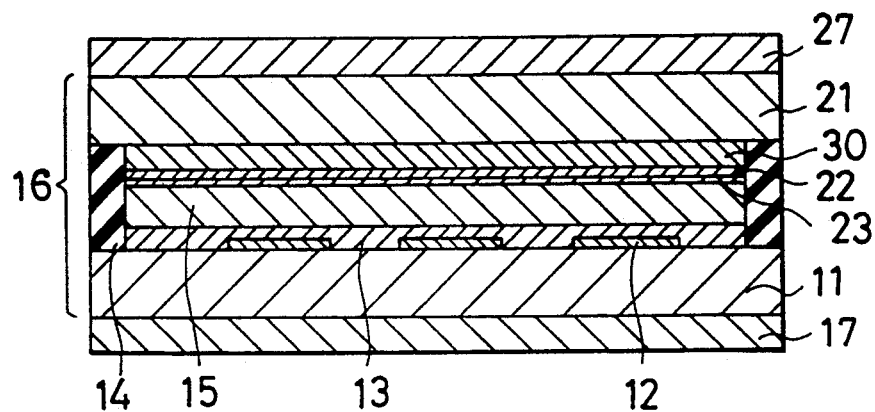

As an aligning film 16 to align LC polymer film 17, similar to aligning films 13 and 23 of LC cell 16 in FIGS. 2 to 4, the followings can be exemplified:

(1) coated film of polymer such as polyimide or polyamideimide and treated by rubbing;

(2) coated film of organic metal compound and treated by rubbing, with or without heat treatment before the rubbing; and (3) obliquely evaporated film of, for instance, $SiO_2$ deposition.

When a substrate 15 is a plastic film, the LC polymer molecules can be aligned by rubbing the substrate directly and therefore, aligning film 16 is not necessary.

Further, when a substrate 15 is a plastic film, made of, such as polyimide or polyethylene telephthalate, which molecules can be aligned by stretching, by using the monoaxially stretched film as the substrate, LC polymer molecules can be aligned sufficiently without rubbing treatment.

Figure 1:
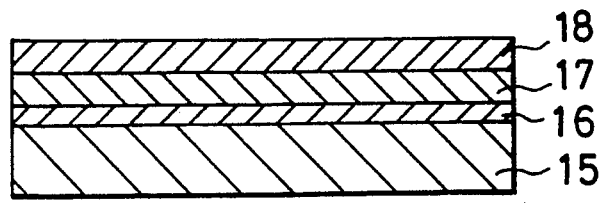
FIG. 1 is an optical phase plate combining a color filter film and a LC polymer composition film of the present invention.

FIGS. 2 to 4 are cross-sectional drawings exhibiting constitutional examples of LC color display device using the combination of color filter film and a phase plate shown in FIG. 1. In these LC color display devices, a pair of substrates 11 and 21 are placed face to face and with a gap between them. In a space formed by the substrates 11, 12 and sealing material 14, LC is sealed as LC layer and forming a LC cell. On inner surfaces of substrate 11 and 21, aligning films 13 and 23 to align LC molecules to one direction and electrodes 12 and 22 to apply voltage on LC layer are formed. 17 and 27 are polarizers and between polarizer 27 and LC layer 15, a combination, 30, of color filter film and optical phase plate having LC polymer as its main functional constituent is placed.

In LC layer 15, LC exhibits nematic or cholesteric phase having a positive dielectric anisotropy and due to aligning films 13 and 23, LC molecules are aligned nearly homogeneous in a plain parallel to the substrate in the absence of a voltage applied.

It is preferable that LC is twisted between two substrates 11 and 21 with its helical axis perpendicular to a plane of the substrate 11 and an angle of the twist is preferably 120° to 360°. When a twisted angle is small, a steepness of voltage and transmission relationship is prone to be worsened and as a result a multiplex drive properties is reduced.

Figure 5:
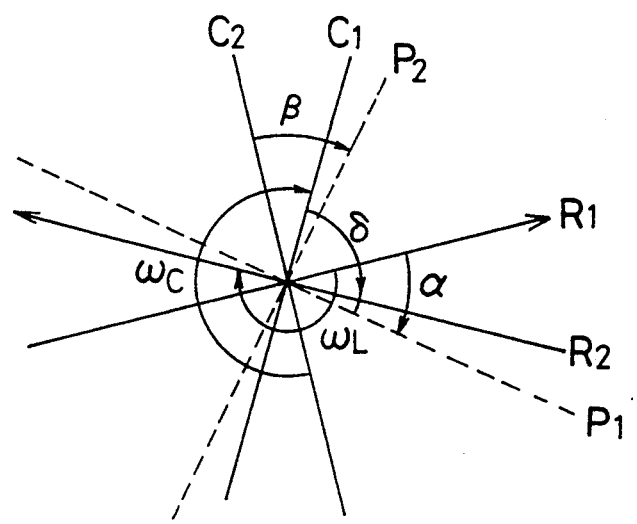
FIG. 5 explains definitions of several angles involved in the present invention.

Refer to FIG. 5. A twisted angle of LC can easily be controlled by arranging aligning direction $R_2$ for aligning film 13 formed on substrate 11, aligning direction $R_1$ for aligning film 23 formed on substrate 21, a pitch of LC and thickness of LC layer.

A retardation $R_L$ (rad) of LC layer 15 (being twisted) at a wave length of λ can be calculated by the following equation (1) using a refractive index anisotropy, $\Delta n_L$, thickness of LC layer 15, $d_L$, and a twisted angle $\omega_L$:

$$R_L = [\omega_L^2 + \pi^2(\Delta n_L \cdot d_L/\lambda)^2]^{\frac{1}{2}} \qquad (1).$$

To obtain a good contrast, it is preferable to have $R_L$ in a range of $\pi$ to $3\pi$ and is more preferable in a range of 1.5 to 2.5 $\pi$ at a wave length λ=550 nm. When the retardation is expressed in Δn·d, it depends on a twisted angle but usually 0.4 to 1.3 μm is preferable.

An alignment of LC polymer film in a combination 30 is immobilized and if LC layer 15 is twisted, LC polymer film has also twisted molecular configuration in a reverse direction.

A LC polymer film in 30 has a birefringence due to its optical anisotropy. A retardation $R_C$ of the film can be calculated by the following equation (2) using a refractive index anisotropy of the film, $\Delta n_C$, a thickness of the film, $d_C$, and a twisted angle of the film $\omega_C$:

$$R_C = [\omega_C^2 + \pi^2(\Delta n_C d_C/\lambda)^2]^{\frac{1}{2}} \qquad (2).$$

After passing through a polarizer 17, an incident light linearly polarized enters into and passes through LC layer 15 and is divided into an ordinary ray and an extraordinary ray having a phase retardation expressed by the equation (1) between them. Accordingly, the incident light, after passing through the LC cell 15, becomes elliptically polarized and having an elliptical ratio and azimuth which vary according to its wave length. A LC polymer film of the present invention works to make this elliptically polarized light to a liniary polarized light once again. Namely, when a transmission axis of polarizer 27 is set parallel to an azimuth direction of polarized light, a background of display becomes white and when the axis is set perpendicular to the direction, the background becomes white. It is preferable to make $R_C$ nearly equal to $R_L$ or a little smaller than $R_L$ for obtaining a good black and white display image.

In FIGS. 3 and 4, the phase plate comprising a LC polymer is placed at an inner side of substrate 21, that is, between a substrate 21 and LC layer 15. To obtain a desired retardation mentioned above, a thickness of the plate is in the range of 2 to 20 μm. Accordingly, a use of the phase plate hardly increases a thickness and a weight of the device.

In these device structures, to obtain a uniform color compensation, it is necessary to align LC polymer molecules stably and uniformly and to control the alignment strictly. Further, to place the phase plate at an inner side of a substrate of LC cell like these Figures, it is also necessary to make an alignment of LC polymer stable at a temperature for preparing the LC cell. In the present invention, these problems have been solved by using a LC polymer which exhibits a twisted nematic alignment at a high temperature, i.e., a LC phase forming temperature, and becomes glassy state below a glass transition point.

An alignment of LC polymer molecules is performed at a temperature above LC transition point, at which temperature the polymer is in LC phase having nematic structure, and the aligned polymer is cooled to immobilize the nematic alignment.

As a LC polymer, it is necessary to use the polymer becoming glassy below glass transition point and is preferable to use the one not to take smectic phase before becoming glassy. If there exists a smectic phase before becoming glassy, during the cooling process it is unavoidable the polymer pass through smectic phase and as the result, the nematic alignment once uniformly arranged is prone to be disturbed or destroyed.

When a LC polymer which becomes crystalline phase by cooling is used, even if a good alignment is obtained during nematic LC phase, the alignment may be disturbed or destroyed.

A nematic structure of a LC polymer aligned and immobilized as described above is quite stable and uniform even at a temperature for preparing a LC cell by selecting a LC transition point of the polymer higher than a LC cell preparing temperature. From this viewpoint, the higher LC transition point is more preferable, but on the other hand from the viewpoint of productivity it is preferable to set the point in a range of 80° to 300° C. and more preferable in a range of 100° to 250° C. A LC polymer film is treated so that its molecules are aligned along direction $C_2$ on substrate 21. A preferable method of the treatment is (1) first preparing an aligning film as in aligning a general type LC, namely, forming an aligning film, for instance, polyimide or polyvinyl alcohol film coated on substrate 21 and rubbed or SiO film obliquely evaporated on the substrate 21 and then (2) coating LC polymer on the aligning film and heat-treating the polymer film at a LC forming temperature. When the substrate is made of plastic, a rubbing treatment directly on it can also be applied.

As a LC polymer, a polymer which exhibits nematic alignment at LC phase and becomes glassy below glass transition temperature can anyway be used. As instances, main chain type LC polymer such as polyester, polyamide, polyesterimide, or side chain type LC polymer such as polyacrylate, polymethacrylate, polymalonate, polysiloxane can be exemplified. However, in view of an easy synthesis, good aligning property and high glass transition point, a LC polymer comprising polyester, especially, polyester having ortho substituted aromatic unit as one of constituents is preferable. Another aromatic units being bulky, having bulky substituent or having fluorine atom or fluorine containing group as a substituent (hereinafter referred to as "bulky aromatic unit") are similarly preferable as one of constituents.

The ortho substituted aromatic unit in the present invention is a structural unit substituted in ortho position of its aromatic ring in a main chain of the polymer. As a concrete examples, a cathecol unit, a salicylate unit, a phthalate unit and these units having a substituent on its aromatic ring, represented by the following formulae, can be exemplified:

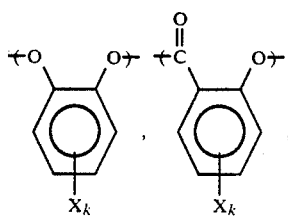

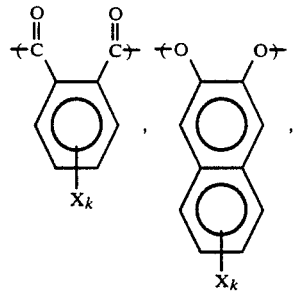

wherein X represents a halogen atom, an alkyl group having 1 to 4 carbon atoms, an alkoxy group having 1 to 4 carbon atoms or a phenyl group and k is an integer of 0 to 2; and among these, examples shown by the following formulae are especially preferable:

A preferable examples of the bulky aromatic units can be shown as follows:

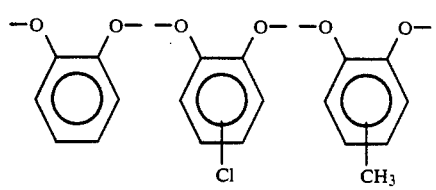

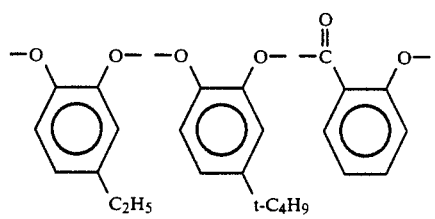

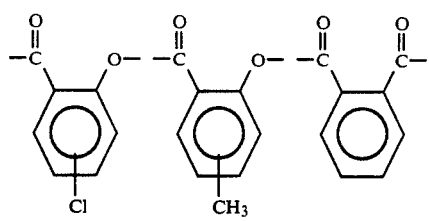

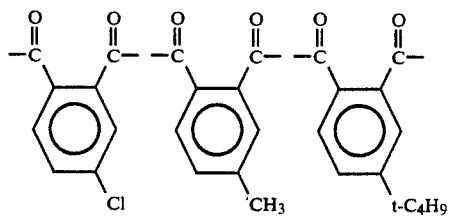

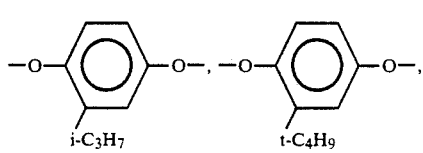

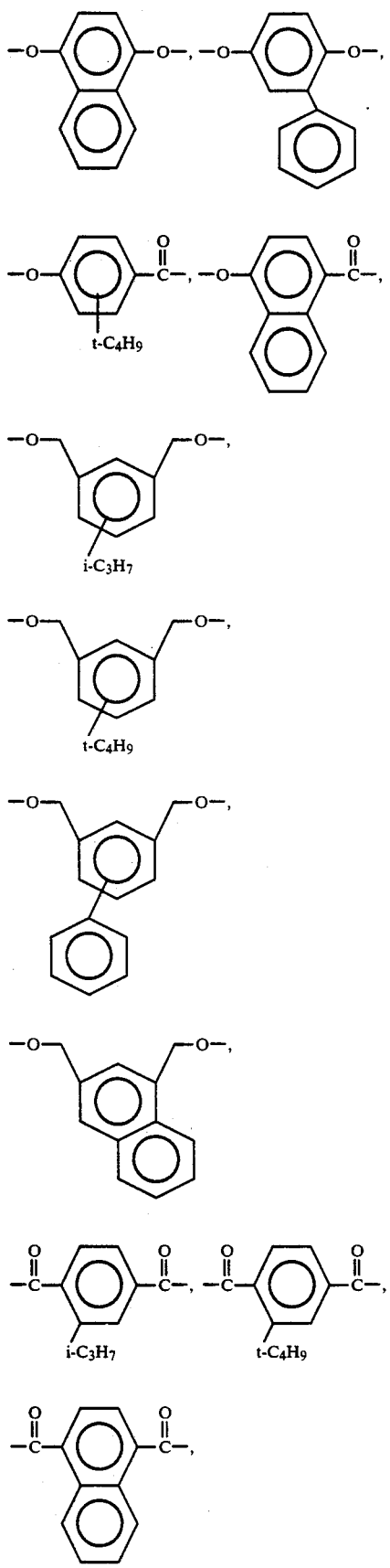

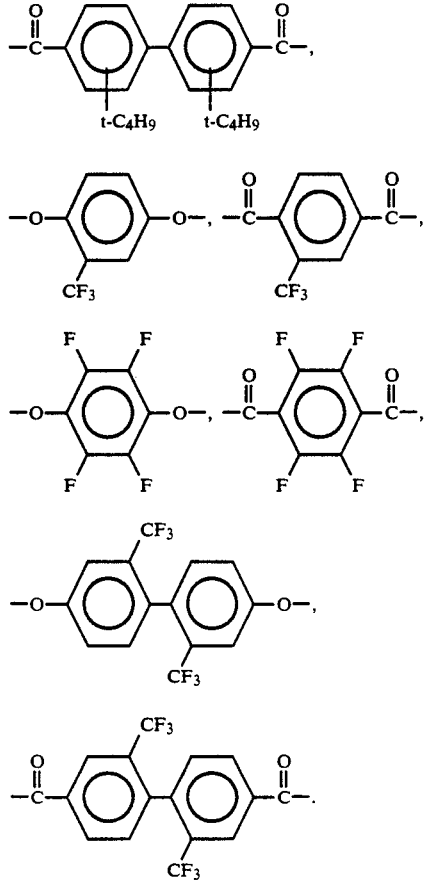

Polyester of the present invention contains, other than the units described above, the following units:
(a) units derived from diols (hereinafter referred to as "diol constituent");
(b) units derived from dicarboxylates (hereinafter referred to as "dicarboxylate constituent"); or
(c) units derived from oxycarboxylates containing a carboxyl group and a hydroxide group in one unit (hereinafter referred to as "oxycarboxylate constituent").

Among the diol constituents, as preferable ones, following aromatic and aliphatic diols can be exemplified:

As aromatic diols:

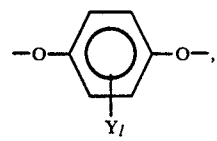

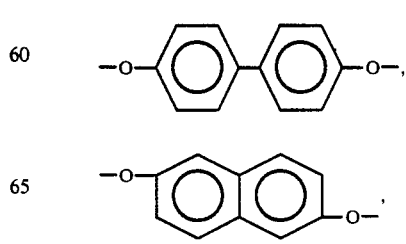

-continued

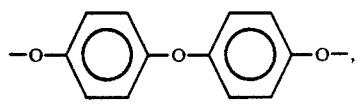

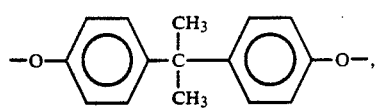

wherein, Y represents a halogen atom, an alkyl group having 1 to 4 carbon atoms, an alkoxy group having 1 to 4 carbon atoms or a phenyl group and l is an integer of 0 to 2.

As aliphatic diols:

—O—(CH$_2$)$_n$—O—  (n is an integer of 2 to 20)

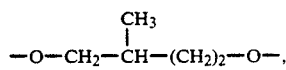

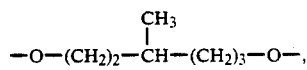

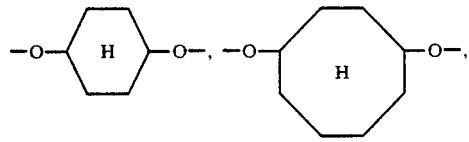

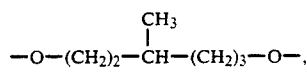

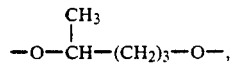

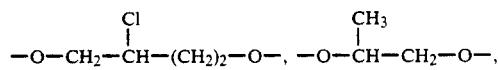

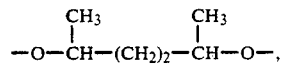

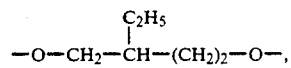

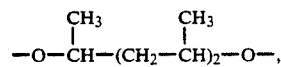

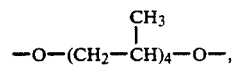

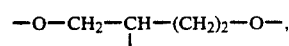

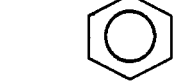

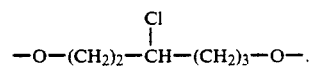

Among these, followings are especially preferable:

—O—(CH$_2$)$_n$—O—  (n = 2, 3, 4, 5, 6, 8, 10 or 12),

-continued

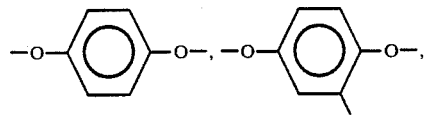

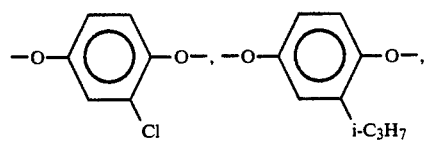

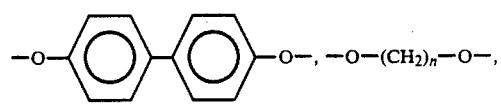

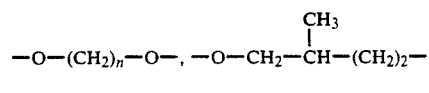

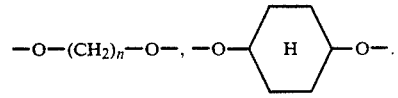

As preferable dicarboxylic constituents, followings are exemplified:

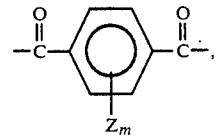

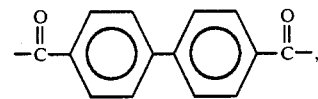

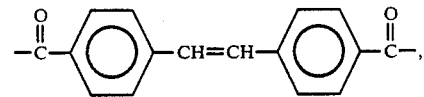

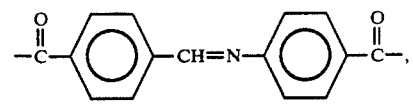

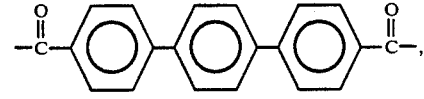

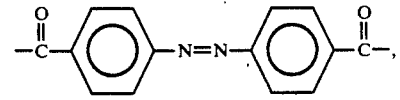

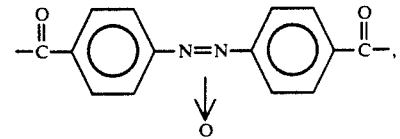

-continued

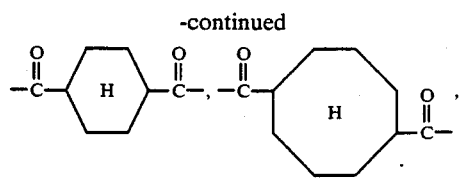

wherein Z is a halogen atom, an alkyl group having 1 to 4 carbon atoms, an alkoxy group having 1 to 4 carbon atoms or a phenyl group and m is an integer of 0 to 2.

Among them, followings are especially preferable:

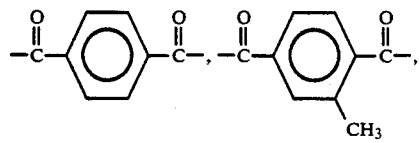

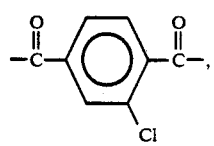

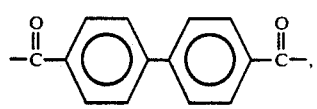

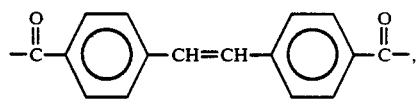

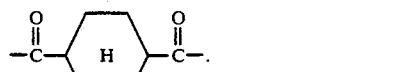

As a preferable oxydicarboxylic constituents, followings are exemplified:

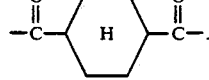

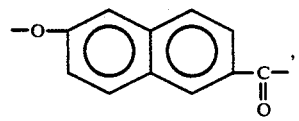

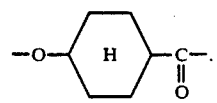

A mole ratio of dicarboxylate and diol (in case of oxycarboxylate, ratio of carboxylic group and hydroxide group) is, similar to conventional polyesters, about 1:1. Mol % of an ortho substituted aromatic unit or a bulky aromatic unit in polyester is preferably in a range of 5 to 40, and more preferably in a range of 10 to 30. If it is less than 5 mol %, when the polyester is cooled below LC transition temperature, a crystalline phase prone to be appear and if it is more than 40 mol %, the polyester does possibly not have LC property. As a representative polyester, following constituting units can be exemplified:

(a) 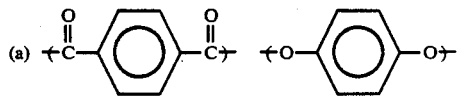

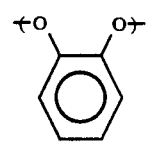

(b) 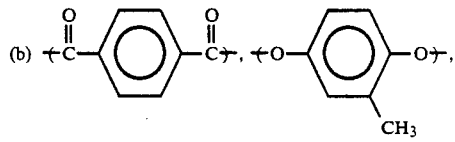

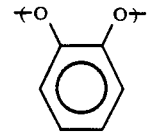

(c) 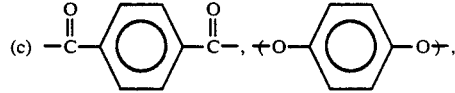

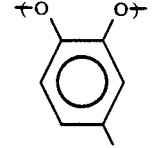

(d) 

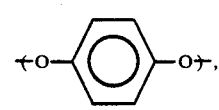

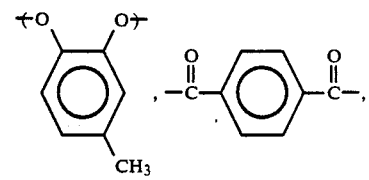

(e) 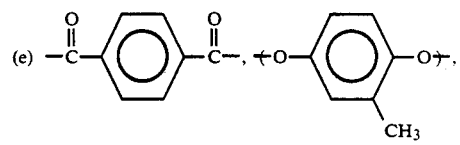

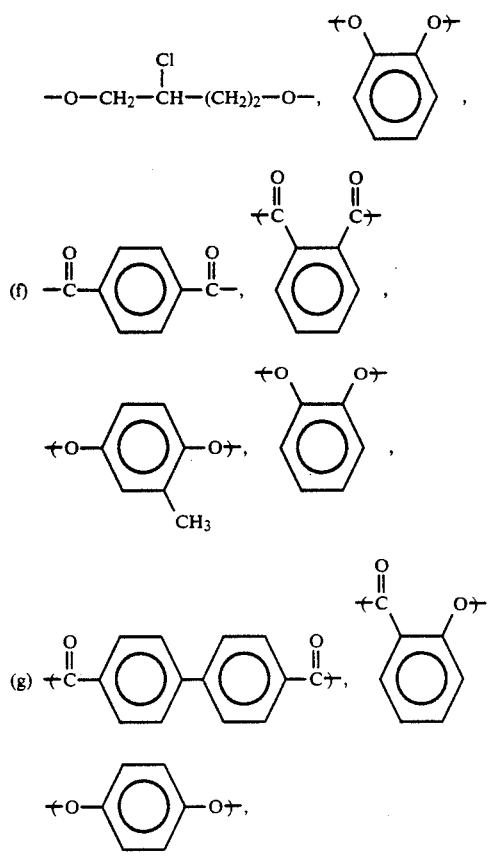

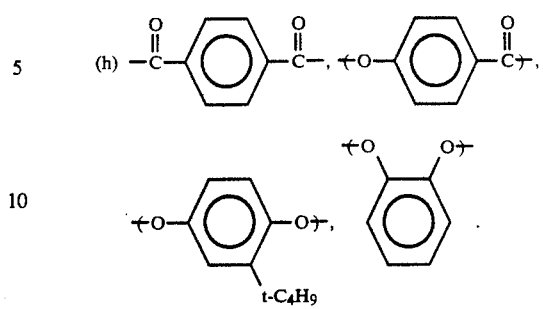

A molecular weight of these polymers, as a inherent viscosity measured at 30° C. in various solvents, for example, 60/40 mixture of phenol and tetrachloroethane, is preferably in a range of 0.05 to 3.0 and is more preferable in a range of 0.07 to 2.0. When it is less than 0.05, a strength of LC polymer film obtained may be too weak and when it is more than 2.0, viscosity of the polymer in LC phase is too high and make its alignment difficult. Therefore, both cases are not preferable. These preferable ranges of molecular weight of the polymer should also be applied to LC polymer hereinafter described in the present specification.

When it is preferable to give a twist configuration to a LC polymer having nematic alignment, an optically active compound is mixed to the polymer. As the compound, a general type LC having an optically active group in its chemical composition is preferably used. Following chemical formulae are the examples of these optically active LC (* marked is an asymmetrical carbon atom):

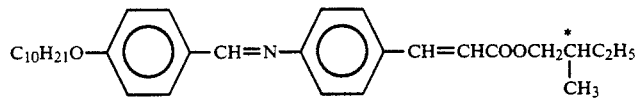

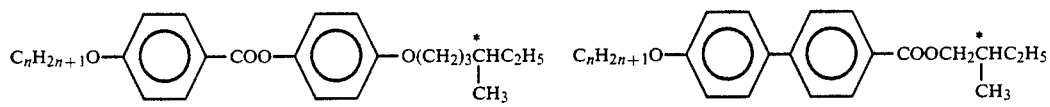

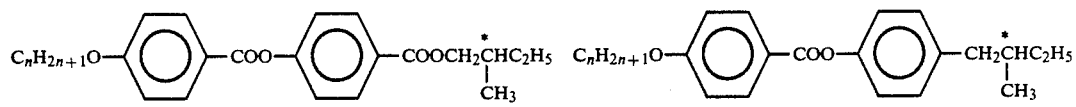

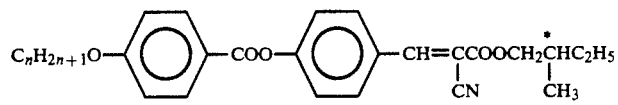

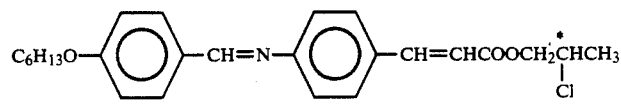

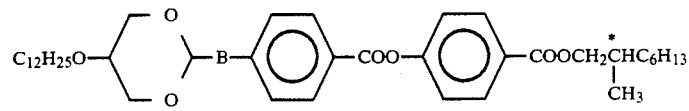

-continued

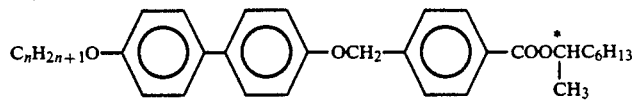

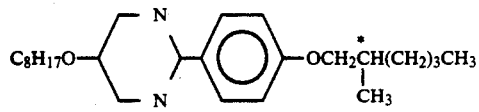     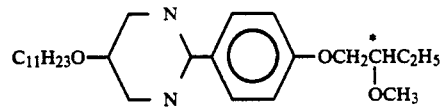

and a derivative of cholesterol.

In FIGS. 3 and 4, the phase plate comprising a LC polymer is set between a substrate 21 and a LC layer 15, the LC polymer is required to have different properties from those of LC polymer placed outside of the substrate 21 or on a substrate provided specially for the polymer. For example, as is shown in FIG. 3, when an aligning film is formed on a LC polymer film, the LC polymer film should be resistant against the heat generated in a course of aligning film forming. Further, when an aligning film is formed by coating, the LC polymer must be resistant to a solvent used and an adherence of the aligning film to the polymer film surface is also important. When the polymer film itself is applied also as an aligning film for LC cell, since the polymer film contacts directly with LC, the polymer should not dissolved out into LC. As is shown in FIG. 4 (this Figure will be explained later again), in case transparent electrodes are formed on a LC polymer film, the polymer film should be resistant against a heat generated during the electrodes formation and an adherence of the electrodes to a surface of the polymer film is also important. From these view point, and in case a twisted alignment of LC polymer is necessary, an optically active compound or an optically active polymer can preferably be used. Although any polymer having an optically active group in its molecular can be used, taking into consideration of a compatibility of the optically active polymer with a base polymer (a LC polymer), it is preferable to use an optically active LC polymer. For instance, as a polymer which is LC and has an optically active group, such as, polyacrylate, polymethacrylate, polymalonate, polysiloxane, polyester, polyamide, polyesteramide, polycarbonate, polypeptide and cellulose can be exemplified. Among them, from a view point of compatibility with a nematic LC polymer, an optically active polyester having aromatic rings as a main constituent is especially preferable. As a practical example, polymers having following composition can be exemplified and these examples include optically active constituents in their molecule (* marked is an asymmetrical carbon)

(a) 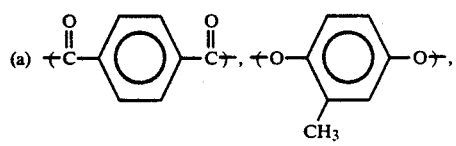

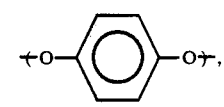

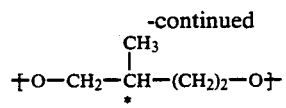

(b) 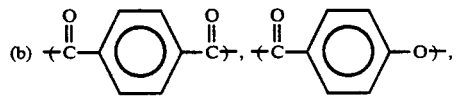

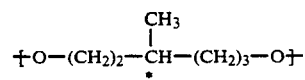

(c) 

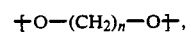

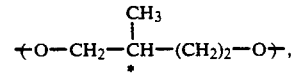

(d) 

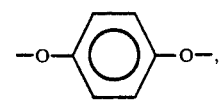

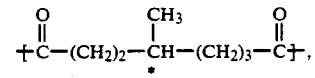

(e) 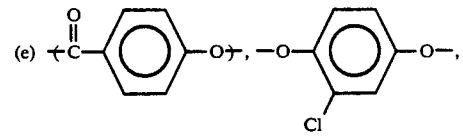

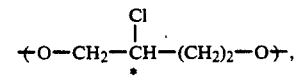

(f) 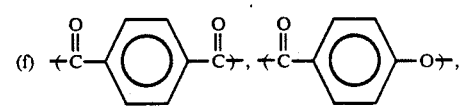

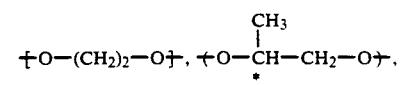

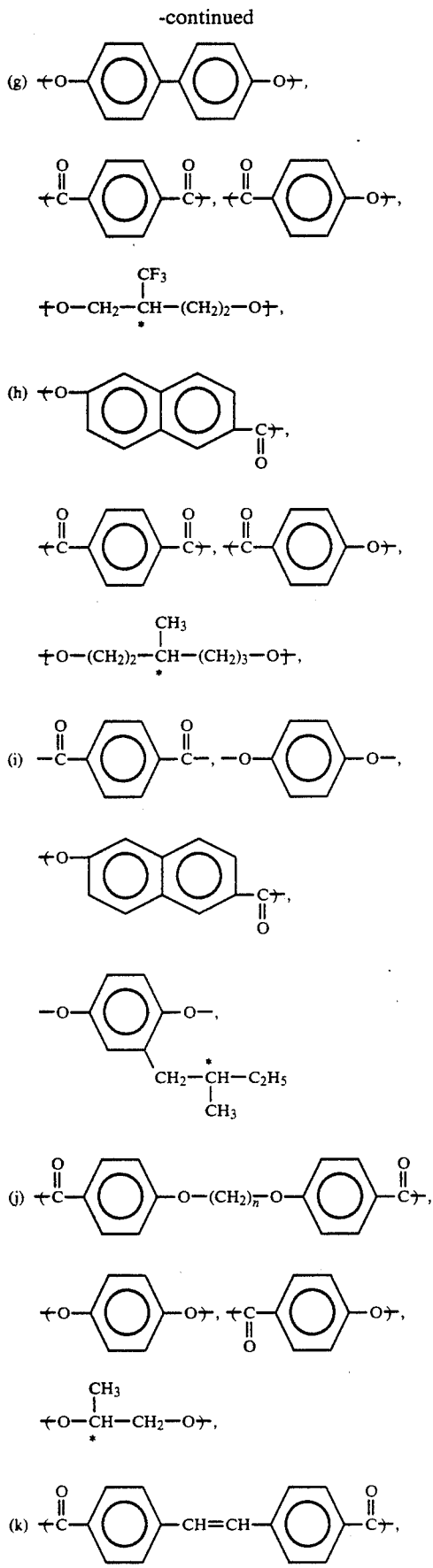
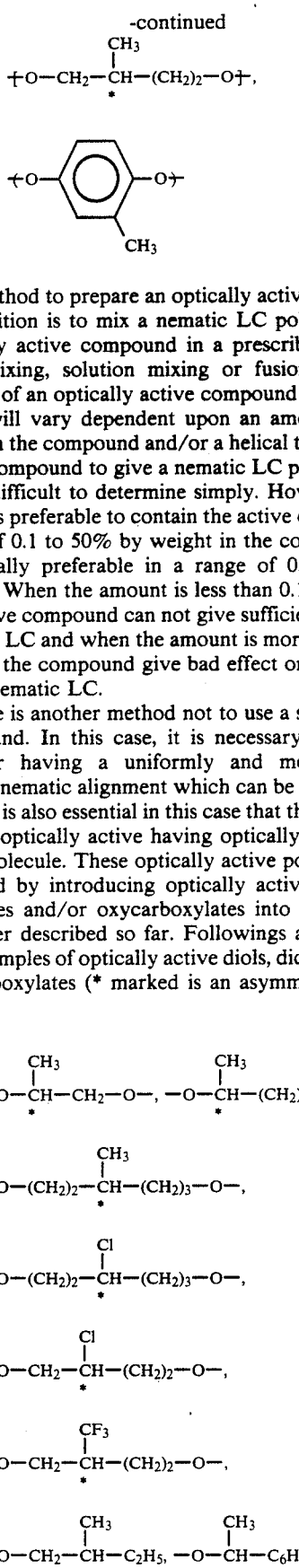

A method to prepare an optically active LC polymer composition is to mix a nematic LC polyester and an optically active compound in a prescribed ratio with solid mixing, solution mixing or fusion mixing. An amount of an optically active compound in the composition will vary dependent upon an amount of active group in the compound and/or a helical twisting power of the compound to give a nematic LC polymer a twist and is difficult to determine simply. However, in general, it is preferable to contain the active compound in a range of 0.1 to 50% by weight in the composition and specifically preferable in a range of 0.5 to 30% by weight. When the amount is less than 0.1% by weight, the active compound can not give sufficient twist to the nematic LC and when the amount is more than 50% by weight, the compound give bad effect on an alignment of the nematic LC.

There is another method not to use a separate active compound. In this case, it is necessary to use a LC polymer having a uniformly and monodomainally twisted nematic alignment which can be easily immobilized. It is also essential in this case that the LC polymer itself is optically active having optically active groups in its molecule. These optically active polyester can be obtained by introducing optically active diols, dicarboxylates and/or oxycarboxylates into a nematic LC polyester described so far. Followings are representative examples of optically active diols, dicarboxylates or oxycarboxylates (* marked is an asymmetrical carbon atom):

-continued

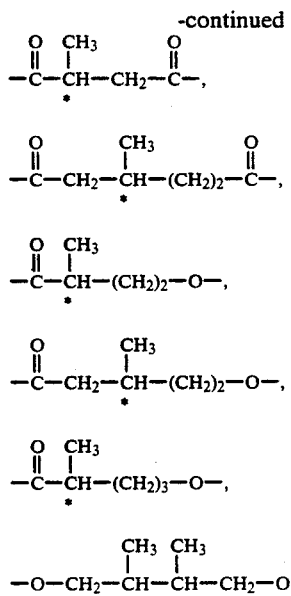

A ratio of these optically active groups in a LC polymer is preferably in a range of 0.1 to 20 mol% and especially preferable in a range of 0.5 to 10 mol%. In this case, the LC polymer molecules on an aligning film are aligned in a direction of treatment and forms twisted molecular configuration with a natural pitch, namely, twisted angle can be calculated by the following equation:

$$\omega = 360 \times d/P_0$$

wherein $P_0$ is a natural pitch, d is a thickness of the LC polymer film and $\omega$ is a twisted angle.

When the active group is less than 0.1 mol%, the plate can not get an enough twist and when it is more than 20 mol%, the function of the plate may be lowered. Accordingly, the both cases are not preferable.

Again, FIG. 4 shows a LC color display device having a little different composition from that of FIG. 3. Substrate 11 and 21 is placed face to face having a gap between them and in a space formed by the substrates 11 and 12 and a sealing material 14, a LC is sealed as a LC layer 15 and the combination forms a LC cell 16.

A combination, 30, of a color filter film and a phase plate comprising a LC polymer film described heretofore is placed at an inner surface of substrate 21. Between substrate 11 and the phase plate, transparent electrodes 12 and 22 to apply voltage on LC layer 15 and aligning films 13 and 23 to align LC molecules to a certain direction. There are polarizers 17 and 27.

One example of methods to prepare an optical phase plate comprising a LC polymer used in the present invention is described. On a substrate 21, an aligning film is formed to align molecules of LC polymer parallel to a plane of the substrate and in one specific direction. Aligning films can be prepared by various methods which are publicly known, that are, oblique evaporation, rubbing treatment on inorganic or organic film by, for instance, cotton cloth. More concretely, coated and rubbing treated polymer film such as polyamide or polyimide or an obliquely evaporated $SiO_2$, MgO or $MgF_2$ film is preferably used. Then a solution of LC polymer is coated on the aligning film prepared above. As a solvent for the polymer, it depends on kind of the polymer and its molecular weight used, however, generally speaking, a halogenated hydrocarbons, such as, chloroform, dichloroethane, tetrachloroethane, trichloroethylene, tetrachloro-ethylene and o-dichlorobenzene; a phenols, such as, phenol, o-chlorophenol and cresol; dipolar aprotic solvents, such as, dimethylformamide, dimethylacetamide and dimethylsulfoxide; ethers, such as, tetrahydrofuran and dioxane; and mixtures thereof can be exemplified. A concentration of the solution depends on a coating method, viscosity of the polymer and a thickness of the film. Necessary thickness of a compensation plate for LC display device is generally 2 to 10 μm and therefore a preferable concentration of the polymer in a solution is 2 to 50% by weight and 5 to 30% by weight is more preferable. As a method for coating, spincoat, roll coat, gravure, dipping method and a screen printing can be exemplified. A solution of the polymer is coated, the solvent is removed by drying, a dried film is heat-treated at a temperature the polymer is in a nematic LC phase for a certain period, aligning the molecule of the polymer and the film is cooled below its glass transition point to immobilize the alignment. The temperature to align molecules of a LC polymer is not lower than its LC transition temperature but is lower than its isotropic transition point. To make an interfacial effect for alignment higher, it is preferable to make a viscosity of the LC polymer lower and therefore higher aligning temperature is preferable. However, if the temperature is too high, it is not preferable because an increase of manufacturing cost and lowering of processability are induced. In general, a temperature within a range of 50° to 300° C. is preferable and a range of 100° to 250° C. is more preferable. At the same time, it is necessary the LC polymer is in a LC phase at this temperature. Further, the polymer can be aligned after once heated the polymer to the temperature it becomes an isotropic liquid phase and then cool the polymer to a LC forming temperature. A time for heat treatment depends on a composition and molecular weight of the polymer, but generally a range of 10 seconds to 60 minutes is preferable and a range of 30 seconds and 30 minutes is more preferable. If the time is too short, the alignment may become insufficient and if it is too long, the productivity is lowered. After an alignment of LC polymer molecules is completed, LC polymer film is cooled to below glass transition point and its alignment can be immobilized. A rate of cooling is not limited and it is enough only by transferring the film from heated atmosphere to cooled atmosphere below the glass transition temperature. Since most of the device are used around room temperature, a glass transition point of LC polymer is preferable not less than 60° C. If the point is lower than 60° C., sometimes an already immobilized alignment is broken and is not preferable. A thickness of a LC polymer film is preferably not thicker than 100 μm and not thicker than 50 μm is especially preferable. If the thickness of the film is more than 100 μm, it becomes difficult to have a uniform alignment.

FIG. 1 represents an example of composition in which color filter film 18 is set after a LC polymer layer 17 is formed. In this case, by forming a color filter film with a printing method such as screen printing, red, blue and green color patterns, which are necessary for multicolor display device or fullcolor display device, can be prepared.

When necessary dyes and/or pigments are added to a LC polymer or a LC polymer is colored by introducing color groups in its molecules, the LC polymer film 17 itself can also work as a color filter and a color filter 18 can be omitted.

Substrate 15, which is used to form a LC polymer film, can share a function of upper substrate 21 of LC cell 16 in FIG. 2 and in this case any one of substrates 11 or 15 can be omitted.

When a color filter film or a colored LC polymer film 10 is formed to show a color pattern such as a dot-pattern or a strip-pattern, in order to avoid a visual gap between color pattern and color elements of LC cell generated by watching a display device from an oblique direction, it is effective to omit anyone of substrates 11 or 15. When a combination of a phase plate and a color filter film, layers 15 to 18 in FIG. 1 which correspond to layer 30 in FIG. 2, is placed between substrate 21 and polarizer 27 as is shown in FIG. 2, it is also effective to avoid the gap if substrate 15 (in FIG. 1) is set to face polarizer 27.

FIG. 6 shows a cross-sectional composition of a phase plate having an aligning film made of a specific polyimide. This phase plate (hereinafter referred to as "phase plate A") has especially uniform and strict alignment of LC polymer molecule and good for an optoelectronic use. In this FIG. 1 is a substrate, 2 is an aligning film and 3 is a LC polymer film which is thermotropic.

Substrate 1 is preferably made of a transparent glass, polymer or ceramic. As a transparent polymer, polyester, such as, polyethylene telephthalate, polyarylate, polyethylene naphthalate, polybutylene telephthalate; polyether sulfon; polyetherether ketone; polysulfon; and polyphenylene sulfide can be exemplified. In the case this phase plate is used for optoelectronic device, the plate having a small birefringence is most preferable and as the substrate, a plastic such as polyarylate, polyether sulfon, polysulfon, polyphenylene sulfide; a glass or a ceramic can be preferably used.

An aligning film 2 is a rubbed polyimide film. As the polyimide, one prepared by heat treating or chemically ring forming polyamic acid, which is a precursor of polyimide, is preferably used. Thickness of a polyimide film is preferably in a range of 200 to 10,000 Å and more preferably 300 to 3,000 Å. When the thickness is less than 200 Å, it is difficult to have uniform alignment and when it is thicker than 10,000 Å, it is not preferable because its original yellow color becomes remarkable. During the course preparing this phase plate A, the aligning film 2 contacts with a solution of LC polymer, therefore the film 2 should have solvent-resistant property. This solvent-resistance can be obtained by using a polyimide film having an elongation at break not higher than 15%.

The followings are described just to assist general understanding. An aligning film prepared by rubbing treatment, for instance, a coated film of soluble polyimide represented by the formulae (C-1), (C-2) and (C-3), which are already imidized; or a coated film of polyamide or soluble nylon, after coated with a solution of LC polymer, it is possible the aligning film is solved by the solution or even if it is not solved it is also possible an alignment of the film is disturbed, although these aligning films can be sufficiently used for an alignment of a general type LC.

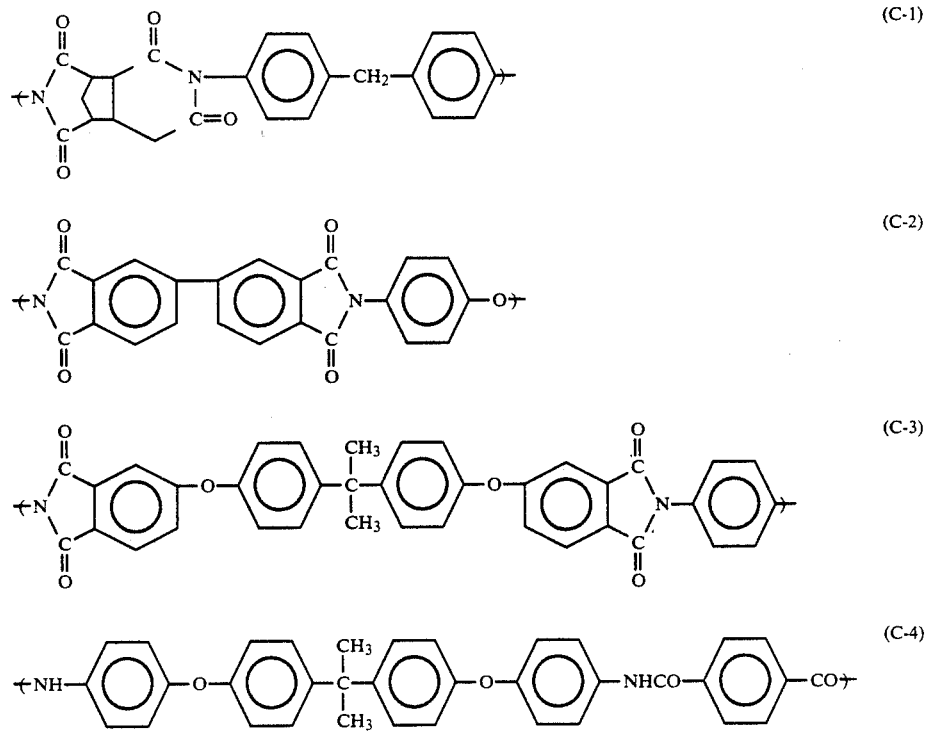

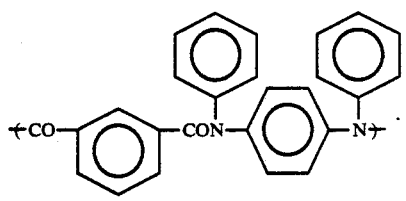

Further, even with a method to obtain an insoluble polyimide film by coating a polyamic acid solution, if an obtained polyimide has an elongation at break higher than 15%, a uniform alignment of the obtained film is sometimes difficult.

An elongation at break in the present invention is an elongation of a polyimide film with a usual thickness of a micron unit, measured according to ASTM-D 638, since the film of less than 10,000 Å in thickness can not be measured. A correlation between the elongation, which is a mechanical properties in bulk, and a solvent-resistance of aligning properties of the film has not been clarified yet. However, it is assumed that a polyimide having large elongation at break has a small interaction among its molecules and although the polymer is not solved by the solvent, a surface of the polymer film is swollen or partially solved by the solvent and an alignment controlling power is reduced.

Because of this reason, an aligning film 2 of a phase plate A must be a polyimide film having an elongation at break not larger than 15% which is formed by coating with a polyamic acid solution a substrate surface and ring forming a polyamic acid to polyimide. Further, the aligning film should have rubbing treatment to give LC polymer molecules a monoaxial aligning. An extent how strictly the LC polymer molecules of a phase plate A is aligned can be quantified by the following procedures:

(1) insert a sample of the plate between polarizers;
(2) rotating the sample and find the most darkening angle;
(3) measuring transmittances at the angle (hereinafter referred to as "$T_0$") and at an angle rotated the sample 45° more (hereinafter referred to as "$T_{45}$"); and
(4) calculate a ratio of the two transmittance values, $T_{45}/T_0$.

The results are shown in Table 1. Judging from data on the Table, it is clear that a good alignment in LC polymer film can be obtained as far as an elongation at break of polyimide is 15% or smaller and 10% or smaller is more preferable. However, a plate having the smallest elongation at break is not always the best. Which state is to be used changes case by case depending on various conditions, but, of course, the elongation is one of the most important factors to select the plate. The LC polymer film of the sample plate for Table 1 was prepared as follow:

(1) polyester represented by the following formula was used as a LC polymer;
(2) tetrachloroethane solution of the polymer was coated on an aligning film;
(3) the coated film was dried at 70° C. for 1 hour (thickness of the film was about 1 μm); and
(4) the polymer molecules were aligned by heating the film for 30 minutes at 130° C. at which temperature the polymer exhibits a nematic phase.

(C-5)

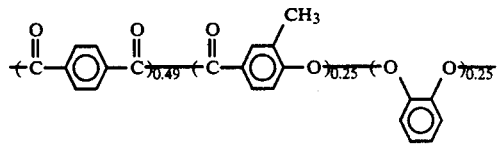

TABLE 1

| Polyimide | Elongation at break (%) | $T_{45}/T_0$ | Uniformity of Alignment |
|---|---|---|---|
| PI-1 | 47 | 1.1 | Divided into small domains |
| PI-2 | 21 | 2.0 | Divided into small domains |
| PI-3 | 12 | 10 | Partly divided into domains |
| PI-4 | 10 | 41 | Uniform monodomain |
| PI-5 | 4 | 90 | Uniform monodomain |
| PI-6 | 2 | 108 | Uniform monodomain |

A method to prepare a phase plate A of FIG. 6 is explained referring to FIG. 7 as follow:

(a) A coated film 2" containing polyamic acid or a derivative thereof as a main constituent is formed. The coated film is formed by coating a solution of polyamic acid on substrate 1 by an already known printing method, such as, spin coat method, dipping method, gravur coat method or roll coat method and then the coated film is heated to remove the solvent. A concentration of the solution depends on a coating method and a viscosity of the solution and can not be determined precisely, however, generally speaking a range of 0.1 to 10% is preferable. As a solvent, N,N-dimethylformamide, N,N-dimethylacetamide, N-methyl-2-pyrrolidone, γ-butyrolactone, N-methylcaprolactam, dimethylsulfoxide and hexamethylphosphoamide can be exemplified.

(b) By heating and ring forming polyamic acid film a polyimide film 2' is obtained. The temperature for the ring formation is preferably in a range of 100° to 350° C. and more preferably in a range of 130° to 350° C. Alternatively, dehydrate catalyst such as an acid anhydride or an organic metal compound can be used to perform the ring formation.

(c) By rubbing a surface of polyimide film 2' to one direction with rubbing material 4. As the material 4, a flocked cloth made of cotton, polyester or nylon; a sponge made of urethane or nylon and a cloth are preferably used. This phase plate A, different from other type of LC display device, only one substrate is used, i.e., a LC polymer film with one surface is attached to the substrate, and another surface is disclosed to the atmosphere during alignment. Therefore, it is necessary for LC polymer in its LC phase to spread uniformly on a coated surface of an aligning film. For this purpose, an aligning film 2 has a surface tension of preferably not smaller than 35 dyne/cm and more preferable not smaller than 40 dyne/cm.

After the process (c) above, there remains processes to form LC polymer film and an alignment of this film.

However, these two processes have been already described in detail, therefore omitted from here to avoid a double description.

A LC polymer molecules contacting an aligning film are aligned parallel to a direction of rubbing and twisted corresponding to a pitch of the LC polymer in a perpendicular direction to the substrate.

EXAMPLE

Hereinafter, Examples of the present invention will be described, however, the present invention is not necessarily limited by these Examples.

EXAMPLE 1

On a glass substrate, an aligning agent, LQ 5200 (manufactured by HITACHI KASEI Co.) containing polyamic acid as a main constituent, is spin-coated and dried in a oven at 100° C. for 10 minutes then heated to 270° C. for about one hour and obtained a polyimide film. A surface of the film was rubbed with nylon flocked cloth to make it an aligning film for LC polymer film.

Separately, solutions of LC polymers, PL-1 and PL-2 (PL-1 is a main LC polymer and PL-2 is an optically active LC polymer) of the following formulae are mixed in a ratio of PL-1:PL-2=90:10 by weight and coated on a substrate. A concentration of the mixed polymer in the solution was 30% by weight.

age diameter of 6.6 μm were dispersed and the substrates B and C were put on together with a sealing agent of epoxy series as an adhesive, having a 6.7 μm gap between them controlled by the plastic beads. A mixture of 99.28% by weight of LC polymer ZLI-2293 (manufactured by Merck & Co.) and 0.72% by weight of an optically active compound S-811 (manufactured by Merck & Co.) was prepared and vacuum sealed in the gap between substrates B and C. A direction of spiral induced by S-811 was reverse against a spiral direction of PL-2. A rubbing direction of aligning films of the substrates B and C is arranged to make an angle of 230° with the direction of S-811. Further, a rubbing direction of an aligning film for LC polymer of substrate A is composed to be orthogonal to the direction of an aligning film for LC of substrate B. A cross-sectional drawing of a composition which substrates A, B, and C are stuck is shown in FIG. 9.

Figure 9:
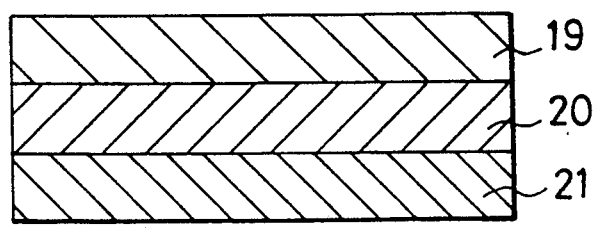

A LC color display device applied the LC cell shown in FIG. 9 performed a display of each color and find it possible that each vivid red, blue and green was displayed and a full color display was also possible.

EXAMPLE 2

To the mixed solution of LC polymers PL-1 and PL-2 prepared in Example 1, a mixture of three kinds of azo dyes of red, blue and green in an optional ratio was solved. Amount of the dye mixture was 3% by weight

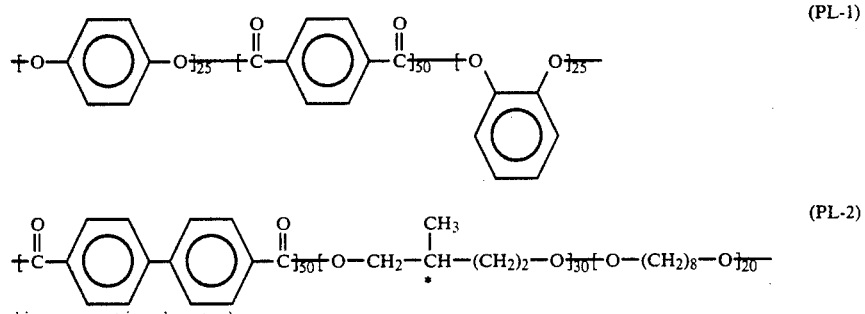

(*marked is an asymmetric carbon atom)

The solvent used was a mixed solvent of phenol and tetrachloroethane in a ratio of 60/40 by weight. The substrate coated was dried in a oven of 90° C. for one hour to evaporate away the solvents. Then, the temperature was increased to 200° C., at which temperature the mixed LC polymers exhibit a nematic phase, and maintained at the temperature for 30 minutes and quenched to a room temperature.

Thus obtained phase plate was inserted between pair of polarizers and observed with eyes. There was a uniform birefringent color and also there was no unevenness in thickness and alignment in the LC polymer film. Analyzing this plate using a polarized light, it was measured that a retardation was 840 nm and a twisted angle was 230°. Then on the LC polymer film, red, blue and green color filters are printed and named this substrate as a substrate A.

Separately, on a pair of substrates for LC cell, transparent electrodes were formed by spattering and made pattern on the electrodes with lisographic method. These substrates for LC cell can be prepared as described before. In this Example, an aligning agent of polyimide series are coated on the substrates, dried, heated and rubbed the substrates, which was named as a substrate B and a substrate C, respectively. On inner surface of the substrate B, plastic beads having an averof the LC polymers. This mixed solution was coated 3 times on the phase plate A prepared as in Example 1 and heated to 200° C. for 30 minutes and quenched to a room temperature. Then in the same manner as in Example 1, a LC color display device, having substrates A, B and C stuck together, was prepared.

The display device exhibit a good color reproducibility as in Example 1.

EXAMPLE 3

Transparent electrodes are pattern formed on a glass substrate. On the substrate a polyimide varnish PIQ (manufactured by HITACHI KASEI Co.) is coated by spin coat method with a thickness of 1,000 Å and heated to 270° C. to have a polyimide film. The obtained polyimide film was rubbed to one direction with tetlon flocked cloth and obtained an aligning film.

Separately, 95 parts by weight of a nematic LC polyester having a repeating unit represented by the formula (A) and 5 parts by weight of an optically active polyester having a repeating unit of represented by the formula (B) was mixed, 15% by weight of the mixture was solved in a mixed solvent of phenol and tetrachloroethane (50:50 weight %) and the solution was coated on an aligning film by spin coat method and dried. As a result, a LC polymer film with a thickness of 3.6 μm was obtained. Then the film was treated at 210° C., at which temperature the polymer exhibit nematic phase, for 30 minutes and quenched to a room temperature. When an immobilized alignment of the plate was observed, it was a twisted alignment and monodomain. Further, $\Delta n_c \cdot d_c$ was 0.82 μm and twisted angle was 230° (clockwise spiral).

On the LC film obtained, a solution of alcohol soluble nylon was coated, dried at 70° C. and the film obtained was rubbed and formed an aligning film for LC cell. One more glass substrate having been treated and aligned in the same manner as above was prepared and the two glass substrates were placed so that treated surface faced each other, alignment directions of respective substrates made angle of 230° and stuck each other to have a gap between them with an aid of spacers.

The gap between the substrates was filled with mixed LC of a nematic LC ZLI 2293 (manufactured by Merck & Co.) and a chiral nematic LC S 811. $\Delta n_L \cdot d_L$ of this LC cell was 0.87 μm and a direction of spiral was reverse (anticlockwise) that of the LC polymer.

The cell was inserted between polarizers and obtained a display device which is similar to the device shown in FIG. 3. Angles are arranged to be $\alpha=\beta=45°$ (upper and lower polarizers are orthogonal) and $\delta=90°$.

Figure 8:
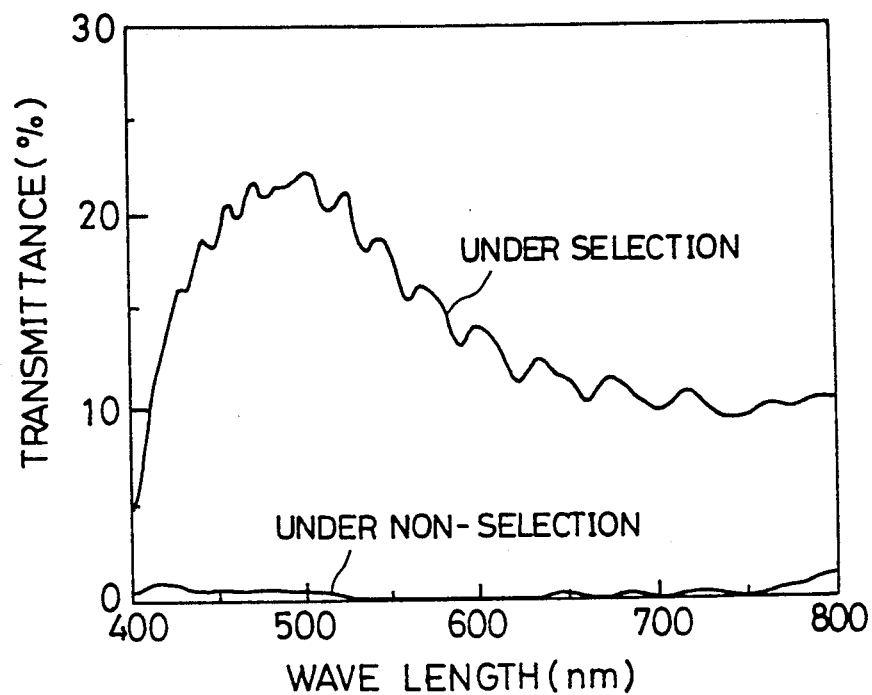
FIG. 8 shows a wavelength dependence of transmittance of the display device prepared in Example 3 and FIG. 9 shows a cross-sectional drawing explaining how substrates are prepared in Example 1 by lamination.

This device was driven in a multiplexing drive at a duty of 1/64 as a test and obtained a uniform display and an excellent black and white display as is shown in FIG. 8.

to make a polyimide film. Then a surface of the polyimide film was rubbed with teflon flocked cloth to one direction and prepared an aligning film.

The same LC polymer solution prepared in Example 3 was coated by spin coat, on the aligning film, dried and a LC polymer film with a thickness of 3.6 μm was formed. Then, this was heated at 210° C. for 30 minutes and quenched to a room temperature. Thus, a phase plate was prepared.

On a LC polymer film of the phase plate, transparent electrodes essentially consisting of indium oxide were formed by spattering and pattern formed by photorisography. On these layers, an ethanol solution of alcohol-soluble nylon was coated, dried at 70° C., rubbing treated and an aligning film for a LC cell was prepared. Another glass substrate aligned in the same way as above was prepared and the two substrates were placed and stuck so as to their respective treated surfaces facing each other with a gap between them adjusted by a spacer and their aligned directions. made an angle of 230°. The gap between the substrates was filled with a mixture of nematic LC ZLI 12293 and a chiral nematic LC S 811 and prepared a LC cell. $\Delta n_L d_L$ of the cell was 0.87 μm and a twisted direction of the LC was reverse (anticlockwise) to that of the LC polymer.

The cell was placed between a pair of polarizers and prepared a LC color display device shown in FIG. 4. It was arranged so that $\alpha=\beta=45°$ (upper and lower polarizers were orthogonal) and $\delta=90°$.

When this device was driven in a multiplexing drive at a duty of 1/200, a same excellent black and white display was observed as Example 1. Further, an actual

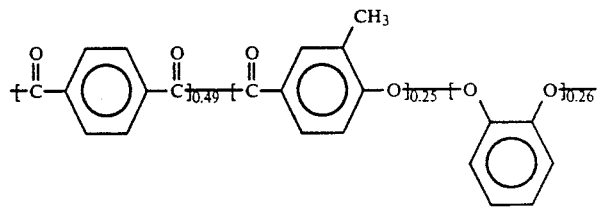

$\eta_{inh} = 0.15; \quad T_g = 95° C.$

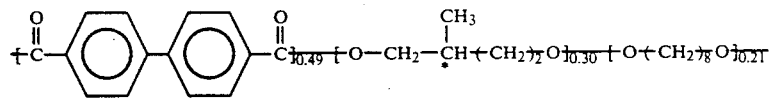

$\eta_{inh} = 0.13$ wherein $\eta_{inh}$ is an inherent viscosity, $T_g$ is a glass transition point and * marked is an asymmetric carbon atom.

EXAMPLE 4

A LC color display device was prepared in the same manner as in Example 3 except that an aligning film made of a soluble nylon was not prepared but a LC polymer film was directly rubbed with nylon flocked cloth. This device also exhibited an excellent display features as in Example 3.

EXAMPLE 5

On a glass substrate, polyimide varnish PIQ was coated with a thickness of 1,000 Å and heated to 270° C.

threshold value was better than that of Example 1.

EXAMPLE 6

A LC color display device was prepared in the same manner as in Example 3 except using a 15% by weight solution of optically active polyester LC polymer having repeating units represented by the formula (C) in a mixed solvents of phenol and tetrachloroethane (weight ratio: 60/40).

An excellent display was also observed with this device in the same manner as in Example 3.

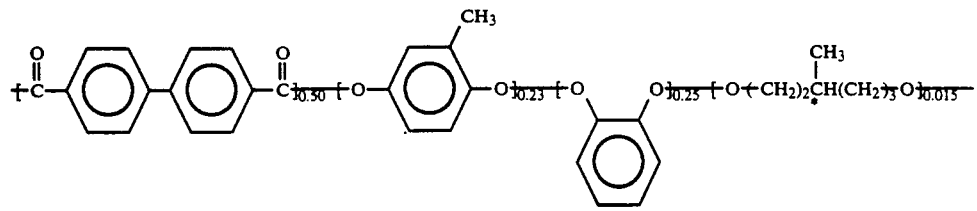

(C)

$T_g = 94°\ C.;\quad \eta_{inh} = 0.09$

EXAMPLE 7

A LC color display device was prepared in the same manner as in Example 4 except using a 15% by weight solution of optically active polyester LC polymer having repeating units represented by the formula (C) shown in Example 6, in a mixed solvents of phenol and tetrachloroethane (weight ratio: 60/40).

The same excellent result was obtained in this device as in Example 4.

SUPPLEMENTAL EXPERIMENTS FOR EXAMPLES 3 TO 7

Each of LC color display device prepared in Examples 3 to 7 were combined with a color filter as the same manner in either of Example 1 or 2 and excellent full-color display was observed in each device.

COMPARISON EXAMPLE 1

A LC color display device was prepared in the same manner as in Example 3 except using a LC polymer having a repeating unit represented by the formula (D) which exhibits a crystalline phase below its LC transition point. The phase plate obtained showed multidomain alignment and exhibited a light diffusion tendency.

When this device was driven in a multiplexing drive at a duty of 1/200, the contrast was too poor to provide this device for practical use.

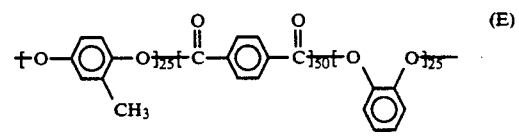

(D)

Crystalline point: 45° C.

EXAMPLE 8

On a glass substrate, polyimide varnish PIQ was coated by spin coating with a thickness of 1,000 Å and heated to 270° C. to make a polyimide film. Then a surface of the polyimide film was rubbed with teflon flocked cloth to one direction and prepared an aligning film.

A 15% by weight solution of LC polymer having a repeating unit represented by the formula (E) in a mixed solvent of phenol and tetrachloroethane (weight ratio: 60/40) was coated on the aligning film, dried at 70° C. and a LC polymer film with a thickness of 1 μm was formed. Then, this was heated at 200° C. for 30 minutes and quenched to a room temperature and obtained a phase plate. When observed a LC polymer film of the plate obtained, its alignment was found to be monodomain and homogeneous.

The phase plate was inserted between a pair of polarizers, which were placed orthogonal each other, and $T_0$ and $T_{45}$ were measured using a white light. A ratio, $T_{45}/T_0$, was 100. Accordingly, an excellent monoaxial alignment of the plate was confirmed.

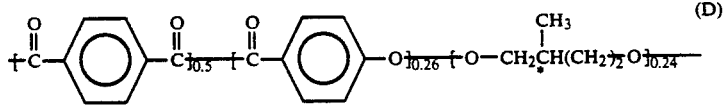

(E)

EXAMPLE 9

A 15% by weight solution of mixed LCs, each of which had a repeating unit represented by the formulae (E) or (F) respectively, with a mixed ratio of 95/5 in a mixed solvent of phenol and tetrachloroethane (weight ratio: 60/40) was coated on a substrate prepared in the same manner as in Example 8, dried at 70° C. and a film of the LC polymers mixture with 1 μm thickness was formed.

A LC polymer having a repeating unit represented by the formula (F) is an optically active LC polymer.

This was heated at 200° C. for 30 minutes and quenched to a room temperature and obtained a phase plate.

When observed a LC polymer film of the plate obtained, it was found that an alignment of the film was monodomain. Further, the plate was placed between polarizers and analyzed with polarized light. As the results, its retardation was 0.26 μm and the LC polymer film had a twist of 45° and exhibited a uniformly twisted nematic composition.

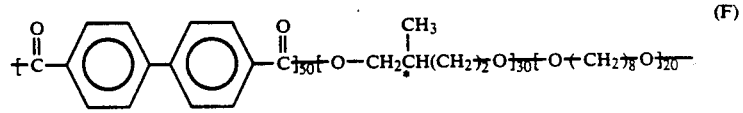

(F)

What is claimed is:

1. A liquid crystal color display device comprising:

a liquid crystal cell comprising a pair of substrates, a liquid crystal layer positioned between the substrates and transparent electrodes on the substrates to apply voltage to the layer;

a pair of polarizers positioned on opposite sides of the cell; and a combination of a color filter film and an optical phase plate having a function to make a light elliptically polarized by passing through the liquid crystal layer a linearly polarized light, the plate positioned between the liquid crystal layer and at least one of the polarizers;

wherein the phase plate comprises a film of liquid crystal polymer composition having polyester as a main constituent, being thermotropic and having a glass transition point.

2. The liquid crystal color display device according to claim 1, wherein said polyester contains an aromatic unit substituted at ortho-positions as one of constituents.

3. The liquid crystal color display device according to claim 2, wherein said aromatic unit substituted at ortho-positions is represented by at least one of the formula shown below:

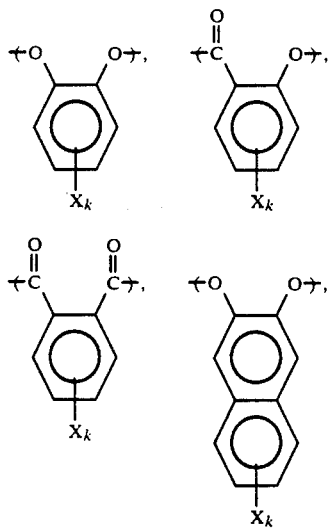

wherein X represents a halogen atom, an alkyl group having 1 to 4 carbon atoms, an alkoxy group having 1 to 4 carbon atoms or a phenyl group and k is an integer of 0 to 2.

4. The liquid crystal color display device according to claim 1, wherein said liquid crystal and said liquid crystal polymer composition are twisted in opposite directions each other.

5. The liquid crystal color display device according to claim 1, wherein said liquid crystal polymer composition contains an optically active compound as one of constituents thereof.

6. The liquid crystal color display device according to claim 1, wherein said phase plate contains
  (i) a substrate;
  (ii) an aligning film formed on the substrate; and
  (iii) a film of said liquid crystal polymer composition formed on the aligning film;
as a main constituent.

7. The liquid crystal color display device according to claim 6, wherein said phase plate is positioned between one of substrate of the liquid crystal cell and the liquid crystal layer and said substrate of the plate works as the substrate of the cell, too.

8. The liquid crystal color display device according to claim 6, wherein said aligning film is an polyimide film having an elongation at break not higher than 15% and is treated with rubbing.

9. The liquid crystal color display device according to claim 6, wherein said phase plate is positioned between the substrate of the liquid crystal cell and the liquid crystal layer and said substrate of the liquid cell works also as a substrate of the phase plate.

10. The liquid crystal color display device according to claim 1, wherein the substrate of the liquid crystal cell also works as the one of polarizers positioned on the side of said substrates.

11. The liquid crystal color display device according to claim 1, wherein said glass transition point of the liquid crystal polymer composition is not lower than 60° C.

12. The liquid crystal color display device according to claim 1, wherein said polyester contains at least one aromatic unit represented by the formulae shown below as one of the constituents:

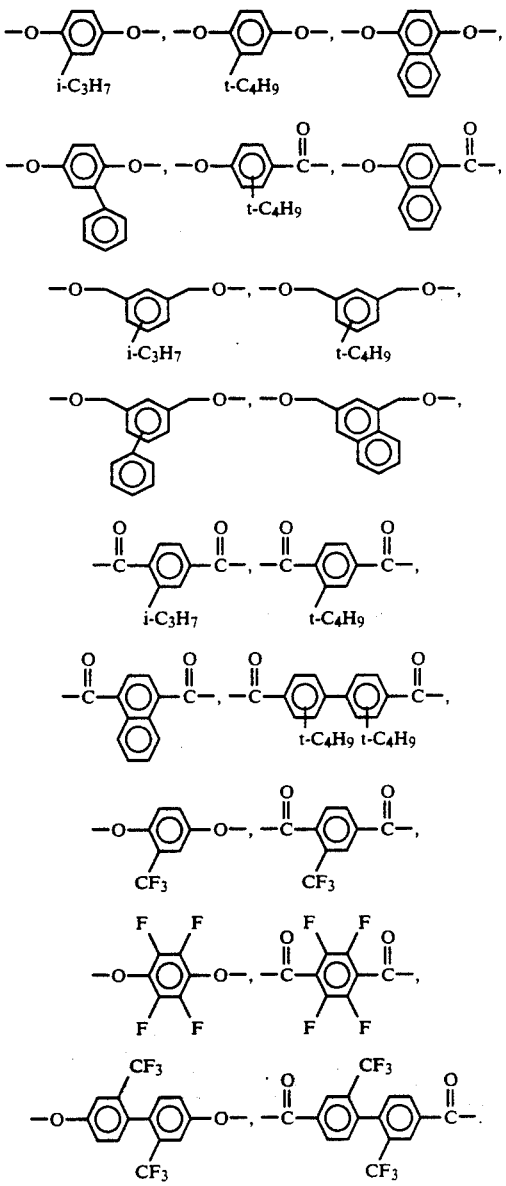

13. The liquid crystal color display device according to claim 1, wherein molecules of said liquid crystal polymer have an optically active group.

* * * * *